United States Patent
Hellwig

[11] 3,716,244
[45] Feb. 13, 1973

[54] SHAFT SEAL

[75] Inventor: Karl Hellwig, Weinheim, Germany

[73] Assignee: Farymann Diesel, Farny & Weidmann, Lampertheim, Germany

[22] Filed: Dec. 16, 1970

[21] Appl. No.: 98,763

[52] U.S. Cl. ................................................277/65
[51] Int. Cl. ............................................F16j 15/38
[58] Field of Search..........277/48, 58, 61, 62, 63, 64; 123/198 PA

[56] References Cited

UNITED STATES PATENTS

| | | | |
|---|---|---|---|
| 2,943,453 | 7/1960 | Jonkers et al. | 277/65 X |
| 3,364,523 | 1/1968 | Schippers | 277/64 X |
| 3,195,421 | 7/1965 | Rumsey et al. | 92/122 |
| 2,133,879 | 10/1938 | Thearle | 277/58 |
| 2,641,515 | 6/1953 | Bankauf et al. | 308/20 |
| 2,699,366 | 1/1955 | Heinrich | 308/187.2 |
| 2,710,205 | 6/1955 | Brkich | 277/61 X |
| 3,337,221 | 8/1967 | Hulsebus et al. | 277/8 |

FOREIGN PATENTS OR APPLICATIONS 1,456,613  9/1966  France ......................277/58

Primary Examiner—Houston S. Bell, Jr.
Assistant Examiner—Donald B. Massenberg
Attorney—Waters, Roditi, Schwartz & Nissen

[57] ABSTRACT

A seal, shaft and housing assembly in which a shaft end projecting from a machine housing bore carries a first rotary member. A second rotary member carried on the shaft is held against a collar portion of the shaft internally of the housing by an axial preload element in the form of a cup spring. The cup spring fits in a recess in an abutment ring which is carried on the shaft and which contacts the second rotary member, and acts between the abutment ring and the first rotary member. An elastic seal is disposed around the shaft in a seating between the abutment ring, second rotary member and a shoulder on the shaft and is deformed to abut in force-locking and sealing manner on the abutment ring, second rotary member and shaft shoulder. A sliding ring sealing element provides a seal between the machine housing bore and the abutment ring.

3 Claims, 1 Drawing Figure

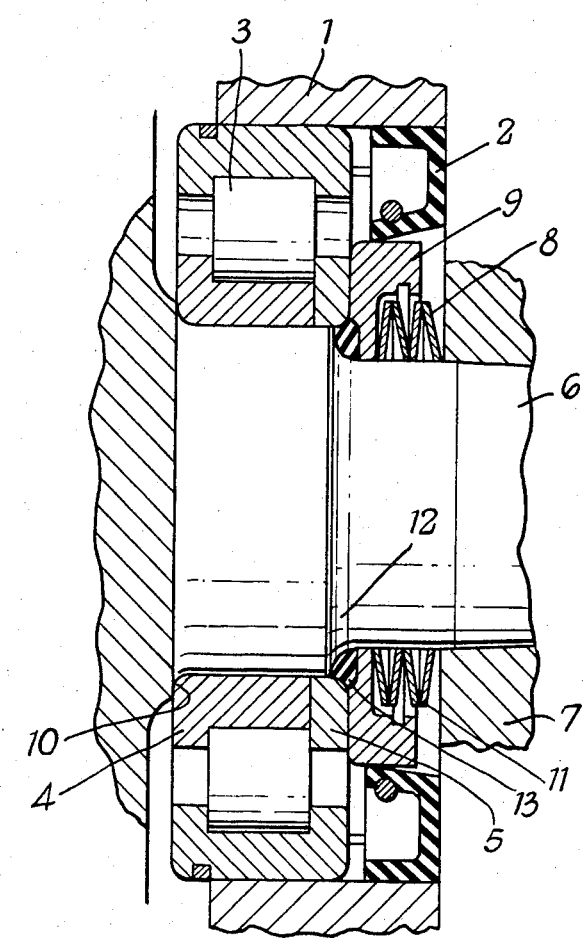

SHAFT SEAL

The invention relates to a seal, shaft and housing assembly having means for sealing the region where the shaft issues fro the machine housing, more particularly for internal combustion engine crankshafts.

BACKGROUND OF THE INVENTION

A seal, shaft and housing assembly is known comprising a shaft having one end projecting through a bore defined by parts of said housing, a first rotary member positively secured on the shaft end projecting from the housing, a collar portion provided on the shaft internally of the housing on which collar portion a second rotary member abuts in force-locking manner under the action of an axial preloading element, and a sliding ring sealing element arranged in said bore and providing a seal between said bore and an abutment ring fixed to the shaft.

It is known to use as an elastic preloading element in the aforesaid assembly a cup spring which is inserted between the first rotary member and the abutment ring, and which presses the latter and also the second rotary member against the shaft collar portion.

This known arrangement has the disadvantage of requiring relatively considerable space in the axial direction of the shaft and the disadvantage that there is a risk that lubricating oil will issue between the abutment ring and shaft.

It is therefore an object of the invention to obviate these disadvantages.

SUMMARY OF THE DESCRIPTION

The foregoing object is accomplished by providing in a seal, shaft and housing assembly comprising a shaft having one end projecting from a machine through a bore defined by parts of said housing, a first rotary member positively secured on the shaft end projecting from the housing, a collar portion provided on the shaft internally of the housing on which collar portion a second rotary member abuts in force-locking manner under the action of an axial preloading element, and a sliding ring sealing element arranged in said bore and providing a seal between said bore and an abutment ring fixed to the shaft, the improvement consisting of at least one cup spring which forms said axial preloading element and is situated at least partly in a cylindrical axial recess of the abutment ring, said cup spring bearing against said first rotary member to press the abutment ring against the second rotary member, and an elastic ring disposed around said shaft in a seating between said abutment ring, said second rotary member and a shoulder formed on the shaft, said elastic ring being deformed by abut in force-locking and sealing manner on said abutment ring said second rotary member and said shaft shoulder.

Owing to the arrangement of the cup spring or springs in the cylindrical axial recess of the abutment ring, the overall length of the sealing means of the assembly is shortened. Furthermore the elastic ring prevents the issuing of lubricating oil between the abutment ring and the shaft. The elastic ring also constitutes a kind of clamping ring which prevents slip of the abutment ring on the shaft.

The aforesaid sealing and clamping action of the elastic ring is advantageously promoted by the fact that the seating is of triangular cross-section and by the fact that the undeformed cross-section of the elastic ring is circular.

BRIEF DESCRIPTION OF THE DRAWINGS

Other objects, features and advantages of the invention will become apparent on reading the following detailed description. Such description makes reference to the annexed single FIGURE drawing which shows in part-section a seal, shaft and housing assembly according to one embodiment of the invention.

DETAILED DESCRIPTION OF THE PREFERRED EMBODIMENTS

Describing now the drawing, as will be observed by referring thereto, the therein exemplary illustrated embodiment of seal, shaft and housing assembly will be seen to comprise a machine housing 1 of which only the wall of a bore thereof is shown through which projects one end of a shaft 6 and which accommodates a sliding ring sealing element 2 and a roller bearing 3 whose inner race 4 and rim ring 5 together form a second rotary member. Instead of the illustrated roller bearing it would be possible, for example, for a gearwheel or an oil splash lubrication ring to form the second rotary member. A first rotary member in the form of a hub of a flywheel 7 is positively fixed on a tapered end portion of the shaft 6. Instead of a flywheel it would alternatively be possible for the first rotary member to be a belt pulley or some other similar part. Conveniently the shaft 6 is a crankshaft of an internal combustion engine.

In the assembly illustrated, the shaft 6 has a collar portion 10 provided on the shaft internally of the housing 1. An axial pre-loading element basically in the form of at least one cup spring 8, and in this embodiment in the form of two cup springs 8 is provided on the shaft 6. The cup springs 8 bear on the hub of the flywheel 7 and press an abutment ring 9 fixed to the shaft, against the rim ring 5, and thereby press the inner race 4, against the shaft collar portion 10 in force locking manner. The abutment ring 9 is constructed as an angle member, so that a cylindrical recess 11 is formed axially in the ring 9 in which recess 11 and cup springs 8 are partly accommodated. This permits a reduction in the axial dimensions of the assembly. At the place where the rim ring 5 and the abutment ring 9 meet one another, there is situated on the shaft 6 a shoulder 12 which together with the rings 5 and 9 forms a triangular annular space or seating in which an elastic ring 13 is situated. The elastic ring 13 in its undeformed state has a circular cross-section that is, is an "O" ring and is so deformed by the rings 5 and 9 and shoulder 12 that it abuts in force-locking and sealing manner on the rings 5 and 9 and shoulder 12. It prevents the escape of lubricating oil at this region and at the same time exerts a certain clamping effect on the rings 5 and 9. The sliding ring sealing element 2 provides a seal between the housing bore and the abutment ring 9.

While there is shown and described a preferred embodiment of the invention, it is to be distinctly understood that the invention is not limited thereto but may be otherwise variously embodied and practiced within the scope of the following claims. accordingly.

What is claimed is:

1. In a seal, shaft and housing assembly comprising a shaft having one end projecting from a machine housing through a bore defined by parts of said housing, a first rotary member positively secured on the shaft end projecting from the housing, a collar portion provided on the shaft internally of the housing on which collar portion a second rotary member abuts in force-locking manner under the action of an axial preloading element, and a sliding ring sealing element arranged in said bore and providing a seal between said bore and an abutment ring fixed to the shaft, the improvement consisting of at least one cup spring 8 which forms said axial preloading element and is situated at least partly in a cylindrical axial recess 11 of the abutment ring 9, said cup spring 8 bearing against said first rotary member 7 to press the abutment ring against the second rotary member 4,5 and an elastic ring 13 disposed around said shaft in a seating between said abutment ring 9, said second rotary member 4,5 and a shoulder 12 formed on the shaft, said elastic ring 13 being deformed to abut in forcelocking and sealing manner on said abutment ring 9 said second rotary member 4,5 and said shaft shoulder 12.

2. Assembly according to claim 1, wherein said seating is of triangular cross-section and the undeformed cross-section of the elastic ring 13 is circular.

3. Assembly according to claim 1, wherein said shaft is an internal-combustion engine crankshaft.

* * * * *